Aug. 1, 1939. T. R. PAULSEN Re. 21,170
WHEELED SCRAPER
Original Filed Jan. 9, 1937 2 Sheets-Sheet 1
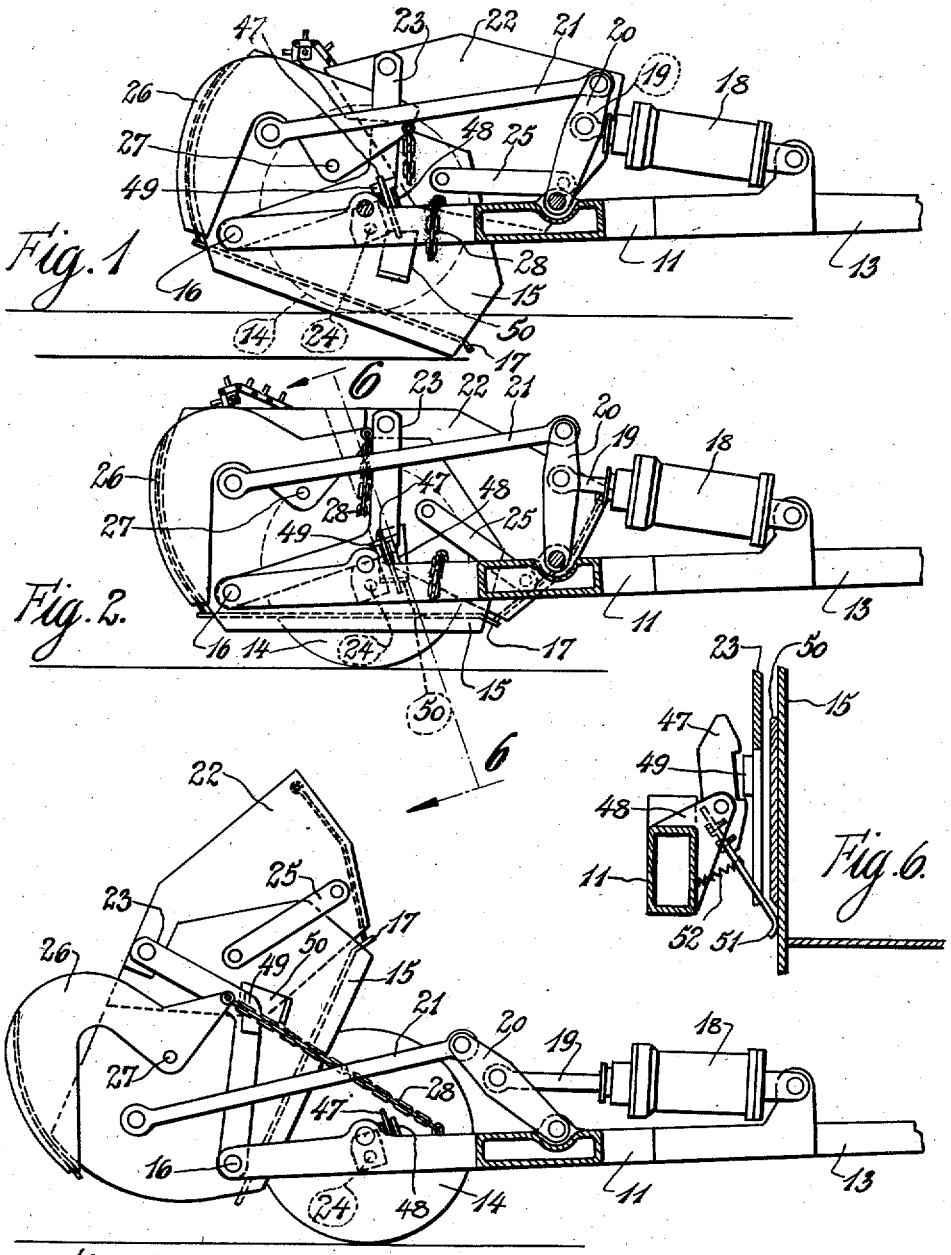
Thomas R. Paulsen,
INVENTOR.
BY Hoar, Ruhloff & Cernand
ATTORNEYS.

Aug. 1, 1939. T. R. PAULSEN Re. 21,170

WHEELED SCRAPER

Original Filed Jan. 9, 1937 2 Sheets-Sheet 2

Thomas R. Paulsen,
Inventor.

By Hoar, Rubloff & Armand
Attorneys.

UNITED STATES PATENT OFFICE 21,170

WHEELED SCRAPER

Thomas R. Paulsen, South Milwaukee, Wis., assignor to Bucyrus-Erie Company, South Milwaukee, Wis., a corporation of Delaware Original No. 2,106,759, dated February 1, 1938, Serial No. 119,790, January 9, 1937. Application for reissue April 12, 1939, Serial No. 267,522

20 Claims. (Cl. 37—133)

My invention relates to new and useful improvements in wheeled scrapers, and more particularly to that type of such scrapers, in which the bowl fills at its front end and dumps at its rear end.

In devices of this sort, the bowl is pivoted, adjacent its rear lower corners, to the carrying frame. A single hydraulic cylinder, or a pair of cylinders, mounted on the frame, serves to rotate the bowl about its pivot, in either direction from its neutral (i. e., carrying) position.

Each end of the bowl is provided with a closure, the front closure being known as the "apron", and the rear closure being known as the "end gate".

When the bowl tips downward into its digging position, the apron opens. When the bowl tips upward into its dumping position, the end gate opens.

But, although these functions have been attained in the prior art with a fair degree of satisfaction, I have found it desirable to effect the following improvements.

A new and similar linkage for the apron should be devised, so as to secure a wider opening of the apron while digging, and furthermore to cause the apron to so move when opening and closing that the dirt will not interfere with these motions, and to relieve the bowl of the strain of supporting the weight of the loaded apron, and to eliminate rollers for opening the apron.

The cylinders should be so positioned as to avoid their being damaged by dirt and stones.

The end gate should be so positioned as to avoid jamming and wear due to interference by the dirt in the bowl, and should be controlled without the use of sheaves, which tend to jam or become disengaged.

The side beams should be so constructed and positioned as not to be interfered with by the ground.

And means should be provided for causing dry sand to fill the bowl, instead of merely piling up in front of the digging edge.

The attainment of these desiderata is the principal object of my invention.

In addition to my principal objects, above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Figures 1, 2, and 3 are side elevations of one form of my scraper, taken along the line 2—2 of Figure 4 inside the wheels, showing a part of the frame in section. In Figure 1 the scraper is in digging position; in Figure 2 it is in carrying position; and in Figure 3 it is in dumping position.

Figure 6 is a front elevation, partially in section, of my anti-toggle catch and associated parts, taken along the lines 6—6 of Figure 2.

Figure 4:
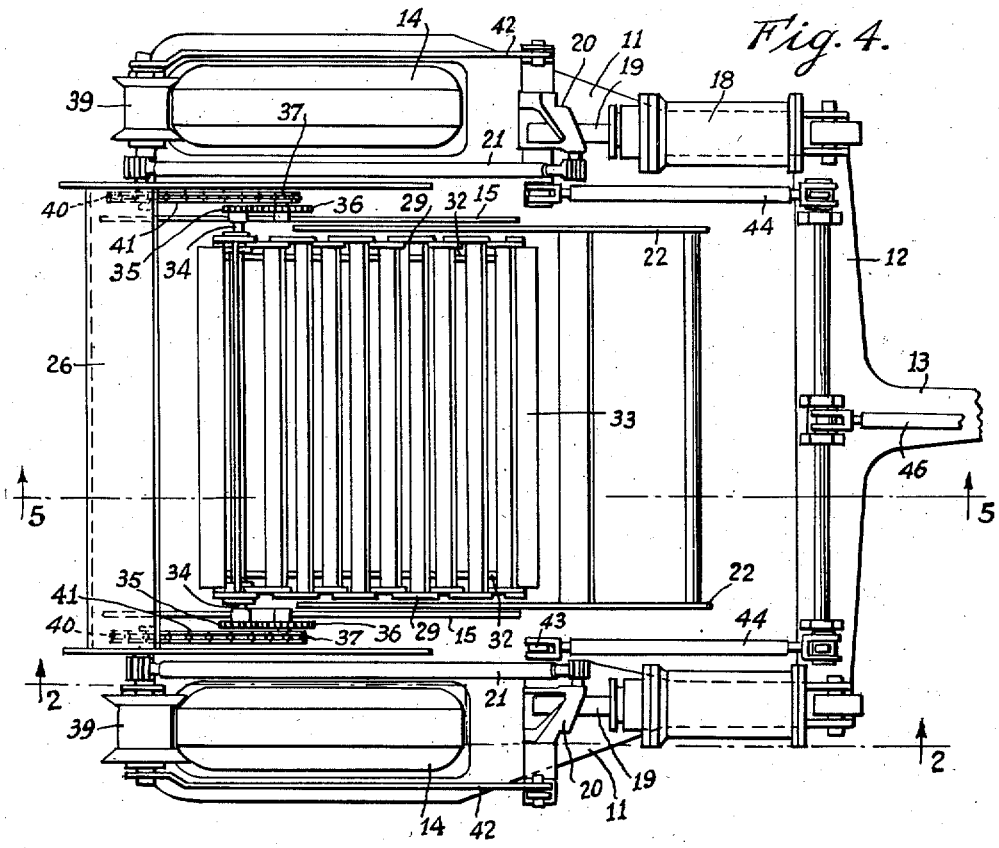
Figure 4 is a plan view of the scraper of Figures 1, 2, and 3, in carrying position.

Referring now to Figure 4, we see that 11, 11 are the side beams, and 12 is the cross beam, and 13 is the tongue, of the main frame of my scraper. The tongue 13, shown broken off, extends to the tractor (not shown) which pulls my scraper. Wheels 14, 14 support the frame.

Turning now more particularly to Figures 1, 2, and 3, we see that the bowl 15 is pivoted at 16 to the side beams 11. The bowl has a digging edge 17.

Hydraulic cylinders 18 are mounted in an elevated position on the main frame, well forward and out of the way of the digging elements. The cylinders rotate the bowl 15 about its pivot 16, by means of piston rods 19, rocker-arms 20 and connecting-rods 21. The cylinders are fed from a source (not shown) on the tractor, by means of piping (not shown), and may be controlled, preferably from the driver's seat (not shown) in any convenient conventional manner (not shown).

Considering the carrying position of Figure 2 as neutral, it will be seen that a retraction of piston-rod 19 will lower the bowl 15 to the digging position shown in Figure 1, and that a thrusting out of this piston-rod will raise the bowl to the dumping position shown in Figure 3.

The apron 22 is pivotally supported by the upper ends of bent rods 23, the lower ends of said rods being pivotally supported by the frame at 16, the same point of support as that which supports the bowl. The elbow of each bent rod rests upon a rotatable stop 24, on the frame. This relieves the bowl of having to carry the weight of the apron and its contents. It will be noted that the four sides of this stop are at successively different distances from its center of rotation, thus affording four different degrees of elevation for the bent rod 23.

The notch in the upper edge of the bowl 15 bears against the pivot support of the apron 22, thus relieving the digging edge 17 of some of the weight of the apron and its contents in the dumping position.

Bars 25, pivoted at one end to the bowl and at the other end to the apron, serve (see Figure 1) to rotate the apron 22 upwardly about its pivotal support on the bent-rod 23, when the bowl 15 descends to its digging position; and (see Figure 3) to maintain the apron closed, when the bowl is lifted to its dumping position.

It will be noted that the lower side of the apron, in opening and closing, moves in its own line, thereby preventing the dirt to be excavated from interfering with this opening and closing.

An end gate 26, pivoted to the bowl at 27, is directly connected to the frame by chain 28. When (see Figure 3) the bowl is lifted to its dumping position, the chain tautens, thus opening the end gate to permit the contents of the bowl and apron to escape rearwardly.

In Figures 1 and 2, the middle portion of chain 28 is omitted, to avoid obscuring parts associated with the dog 47, later to be described.

It will be noted that the side arms of the end gate 26 are disposed outside of the sides of the bowl 15, thus preventing the dirt within the bowl from interfering with the opening and closing of the gate, and from causing wear thereof.

It will be noted that the side beams 11, by lacking a downward camber at their rear ends, are kept well elevated, so that they will not become mired if the wheels sink into soft ground.

Figure 5:
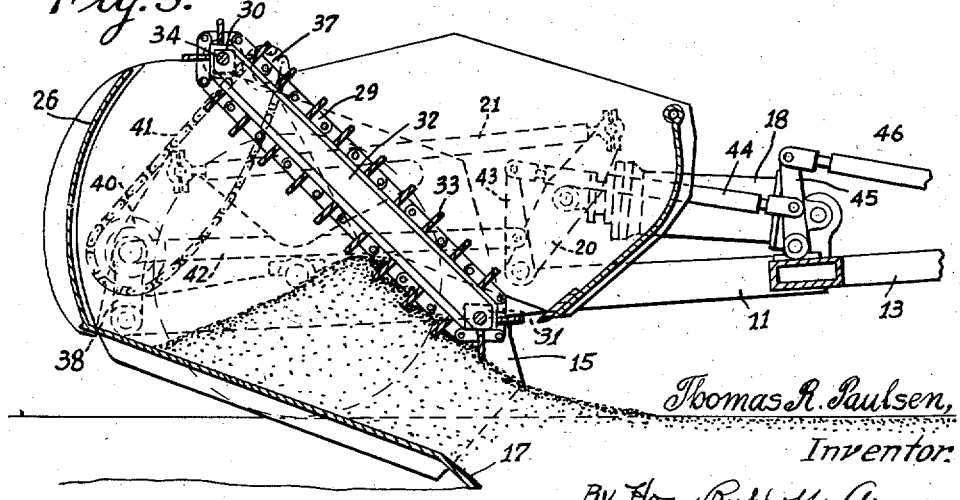
Figure 5 is a vertical longitudinal section of that scraper, taken along the lines 5—5 of Figure 4, except that Figure 5 is in digging position.

Turning now more particularly to Figure 5, we see that 29 are continuous chains, passing over upper tumblers 30, and lower tumblers 31. The upper tumblers are pivotally carried by the bowl, and the lower tumblers are pivotally carried by a ladder 32, which in turn is pivotally supported by the bowl at the same axis as the upper tumblers. The chains 29 carry slats 33, or other means of kicking sand.

The shaft 34, to which the upper tumblers 30 are keyed, has keyed to it pinions 35, which engage gears 36, also carried by the bowl 15. Keyed to rotate with each gear 36 is a sprocket 37.

The links 38, pivotally supported by side beams 11, carrying friction wheels 39 at their upper ends. Keyed to rotate with each of these friction wheels is a sprocket 40. Chains 41 drivably connect sprockets 40 to sprockets 37.

Through rods 42, levers 43, rods 44, levers 45, rods 46, and control means (not shown) at the driver's seat, friction wheels 39 can be rocked forward into contact with the rubber tires of wheels 14. When in such contact, the clockwise motion of wheels 14, as the scraper moves forward, will rotate friction wheels 39 counter-clockwise. This motion is transmitted through sprockets 40, chains 41, sprockets 37, gears 36, pinions 35, and tumblers 30, to drive the chains 29 clockwise; and thus cause the slats 33 to kick the sand, piled up by the digging edge 17, into the bowl.

As the sand piles up in the bowl, the front end of the ladder 32, being floating free, rises; so that the slats always rest lightly on the top of the pile of sand. This free-floating is one of the important features of my invention.

This sand kicker of mine, although of particular use in the combination in which it is here shown and described, would also be useful if the "bowl" were the dipper of a power-shovel, or the bucket of a dragline excavator, or any other similar digging instrumentality.

Turning now to Figure 6, we see my optional means to prevent the apron from ever opening so far during digging that it will stick open when the bowl is raised to carrying position, although this is a relatively rare occurrence, and one which the dumping phase of the cycle would automatically correct anyway.

47 is a dog, pivoted on lugs 48, which project inwardly from the top of each side beam 11. As the bowl 15 descends from the dumping position of Figure 3 to the carrying position of Figure 2, the projection 49 on each bent rod 23 slips into the notch in the corresponding dog 47. Further descent of the bowl 15 causes a plate 50 on its side wall to engage the leaf spring 51, thus locking the bent rod securely in place during digging; and thus preventing the impact of the dirt, as it curls into the bowl, from forcing the apron so far open as to wedge it open, and even occasionally to rotate bars 25 so far counter-clockwise that the apron will tend to remain stuck open rather than to close, even when the bowl returns to carrying position. The stops 24 might be omitted and the dogs 47 serve to perform their function. As the bowl rises again from the digging position of Figure 1 to the carrying position of Figure 2, the bent rods 23 are still held down by the dogs 47 engaging the projections 49. Accordingly the bars 25 positively force the apron to close. Then, when the bowl reaches the carrying position of Figure 2, the side of the bowl 15 disengages from the leaf spring 51, and the compression spring 52 tilts the dog 47 to disengage the projection 49, thus permitting the attaining of the dumping position.

It should also be noted that bent rod 23, if raised too far, will come into contact with pivot 27, and thus this pivot alone would to some extent perform the functions of the catch mechanism just described.

Having now described and illustrated one form of my invention, I wish it to be understood that my invention is not to be limited to the specific form or arrangement of parts hereinbefore described, except insofar as the limitations are specified in the appended claims.

I claim:

1. In a scraper, the combination of: a frame; ground supports for said frame; a bowl pivoted at its rear end adjacent its bottom on the frame, for tilting movement in a vertical plane, said bowl being open at both front and rear, and having a digging edge at its front end; links pivoted adjacent the rear of the assembly; a front apron, pivotally supported by the links; eccentric rotatable stops on the frame, supporting the links, whereby to support the apron when the bowl is in its carrying position, and to restrain the apron from accompanying the bowl when the latter is tilted to its digging position; means connecting the apron to the bowl in such a manner that the downward tilting of the bowl from its carrying to its digging position forces the apron to tilt upwardly; an end gate pivoted on the bowl; means, directly connecting the end gate to the frame, to open the gate when the bowl is tilted from its carrying position to its dumping position; means carried by the frame for tilting the bowl; means to kick sand into the bowl; and means to prevent the apron from becoming wedged open during digging.

2. In a scraper, the combination of: a frame; ground supports for said frame; a bowl pivoted at its rear end adjacent its bottom on the frame, for tilting movement in a vertical plane, said bowl being open at both front and rear, and having a digging edge at its front end; links pivoted adjacent the rear of the assembly; a front apron, pivotally supported by the links; stops on the frame, supporting the links, whereby to support the apron when the bowl is in its carrying position, and to restrain the apron from accompanying the bowl when the latter is tilted to its digging position; means connecting the apron to the bowl in such a manner that the downward tilting of the bowl from its carrying to its digging position forces the apron to tilt upwardly; an end gate pivoted on the bowl; means, directly connecting the end gate to the frame, to open the gate when the bowl is tilted from its carrying position to its dumping position; and means carried by the frame for tilting the bowl.

3. In a scraper, the combination of: a frame; ground supports for said frame; a bowl pivoted at its rear end adjacent its bottom on the frame, for tilting movement in a vertical plane, said bowl being open at both front and rear, and having a digging edge at its front end; links pivoted adjacent the rear of the assembly; a front apron, pivotally supported by the links, and having such a bottom conformation that its bottom will move in its own line when the apron opens; stops on the frame, supporting the links, whereby to support the apron when the bowl is in its carrying position, and to restrain the apron from accompanying the bowl when the latter is tilted to its digging position; a pivoted link, connecting the apron to the bowl in such a manner that the downward tilting of the bowl from its carrying to its digging position forces the apron to tilt upwardly; an end gate pivoted on the bowl; means, directly connecting the end gate to the frame, to open the gate when the bowl is tilted from its carrying position to its dumping position; and means carried by the frame for tilting the bowl.

4. In a scraper, the combination of: a frame; ground supports for said frame; a bowl pivoted at its rear end adjacent its bottom on the frame, for tilting movement in a vertical plane, said bowl being open at both front and rear, and having a digging edge at its front end; links pivoted adjacent the rear of the assembly; a front apron, pivotally supported by the links; stops on the frame, supporting the links, whereby to support the apron when the bowl is in its carrying position, and to restrain the pivotal support of the apron from accompanying the bowl when the latter is tilted to its digging position; an end gate pivoted on the bowl; means to open the gate when the bowl is tilted from its carrying position to its dumping position; and means carried by the frame for tilting the bowl.

5. In a scraper, the combination of: a frame; ground supports for said frame; a bowl pivoted on the frame for tilting movement in a vertical plane, said bowl being open at both front and rear, and having a digging edge at its front end; a front apron, pivotally supported by means which is independent of the bowl and which is in turn supported by the frame, in such manner that the apron accompanies the bowl when the latter is tilted to its dumping position; means to restrain the apron from accompanying the bowl when the latter is tilted to its digging position; an end gate pivoted on the bowl; means to open the gate when the bowl is tilted from its carrying position to its dumping position; and means carried by the frame for tilting the bowl.

6. In a scraper, the combination of: a frame; ground supports for said frame; a bowl pivoted on the frame for tilting movement in a vertical plane, said bowl being open at both front and rear, and having a digging edge at its front end; a front apron, pivotally supported by means which is independent of the bowl and which is in turn supported by the frame; means to restrain the apron from accompanying the bowl when the latter is tilted to its digging position; an end gate pivoted on the bowl; means to open the gate when the bowl is tilted from its carrying position to its dumping position; and means, including at least one fluid-power cylinder and cooperating linkage, carried by the frame for tilting the bowl, the cylinder being mounted above and well in advance of the digging edge of the bowl.

7. In a scraper, the combination of: a frame; ground supports for said frame; a bowl pivoted on the frame for tilting movement in a vertical plane, said bowl being open at both front and rear, and having a digging edge at its front end; a front apron, pivotally supported by means which is independent of the bowl and which is in turn supported by the frame; means to restrain the apron from accompanying the bowl when the latter is tilted to its digging position; an end gate, having side portions pivoted on the outside of the bowl; means to open the gate when the bowl is tilted from its carrying position to its dumping position; and means carried by the frame for tilting the bowl.

8. In a scraper, the combination of: a frame; ground supports for said frame; a bowl pivoted on the frame for tilting movement in a vertical plane, said bowl being open at both front and rear, and having a digging edge at its front end; a front apron, pivotally supported by means which is independent of the bowl and which is in turn supported by the frame; means to restrain the apron from accompanying the bowl when the latter is tilted to its digging position; an end gate pivoted on the bowl; means, directly connecting the gate to the frame, to open the gate when the bowl is tilted from its carrying position to its dumping position; and means carried by the frame for tilting the bowl.

9. In a scraper, the combination of: a frame; ground supports for said frame; a bowl pivoted on the frame for tilting movement in a vertical plane, said bowl being open at both front and rear, and having a digging edge at its front end; a front apron, pivotally supported by means which is independent of the bowl and which is in turn supported by the frame; means to restrain the apron from accompanying the bowl when the latter is tilted to its digging position, said means including an excentric stop; an end gate pivoted on the bowl; means to open the gate when the bowl is tilted from its carrying position to its dumping position; means carried by the frame for tilting the bowl.

10. In a scraper, the combination of: a frame; ground supports for said frame; a bowl pivoted at its rear end adjacent its bottom on the frame, for tilting movement in a vertical plane, said bowl being open at both front and rear, and having a digging edge at its front end; links pivoted adjacent the rear of the assembly; a front apron, pivotally supported by the links; means on the frame, supporting the links, whereby to support the apron when the bowl is in its carrying position, and to restrain the apron from accompanying the bowl when the latter is tilted to its digging position; means connecting the apron to the bowl in such a manner that the downward tilting of the bowl from its carrying to its digging position forces the apron to tilt upwardly; an end gate pivoted on the bowl; means connecting the end gate to the frame, to open the gate when the bowl is tilted from its carrying position to its dumping position; means carried by the frame for tilting the bowl; a catch, carried by the frame, for engaging at least one of the links when the bowl is in digging position; and means to automatically lock the catch in this position, and to automatically release it for dumping.

11. In a scraper, the combination of: a frame; ground supports for said frame; a bowl pivoted at its rear end adjacent its bottom on the frame, for tilting movement in a vertical plane, said bowl being open at both front and rear, and having a digging edge at its front end; links pivoted adjacent the rear of the assembly; a front apron, pivotally supported by the links; means on the frame, supporting the links, whereby to support the apron when the bowl is in its carrying position, and to restrain the apron from accompanying the bowl when the latter is tilted to its digging position; means connecting the apron to the bowl in such a manner that the downward tilting of the bowl from its carrying to its digging position forces the apron to tilt upwardly; an end gate pivoted on the bowl; means connecting the end gate to the frame, to open the gate when the bowl is tilted from its carrying position to its dumping position; means carried by the frame for tilting the bowl; a catch, carried by the frame, for engaging at least one of the links when the bowl is in digging position; and means to automatically lock the catch in this position, and to automatically release it for dumping, said last named means being a projection on the catch engaged by the side of the bowl.

12. In a scraper, the combination of: a frame; ground supports for said frame; a bowl pivoted on the frame for tilting movement in a vertical plane, said bowl being open at both front and rear, and having a digging edge at its front end; a front apron, pivotally supported by means which is independent of the bowl and which is in turn supported by the frame; means to restrain the apron from accompanying the bowl when the latter is tilted to its digging position, and to positively close the apron as the bowl returns to its carrying position; an end gate pivoted on the bowl; means to open the gate when the bowl is tilted from its carrying position to its dumping position; and means carried by the frame for tilting the bowl.

13. In a scraper, the combination of a frame; ground supports for said frame; a bowl pivoted at its rear end adjacent its bottom on the frame for tilting movement in a vertical plane, said bowl being open at both front and rear and having a digging edge at its front end; links pivoted adjacent the rear of the assembly; a front apron supported by the links; connections between the bowl and the apron; stops on the frame, supporting the links, whereby to support the apron when the bowl is in its carrying position, and in coaction with the above-mentioned connections to restrain the apron from accompanying the bowl when the latter is tilted to its digging position; an end gate pivoted on the bowl; means to open the gate when the bowl is tilted from its carrying position to its dumping position; and means carried by the frame for tilting the bowl.

14. In a scraper, the combination of: a frame; ground supports for the frame; a bowl pivoted on the frame for tilting movement in a vertical plane, said bowl being open at both front and rear, and having a digging edge at its front end; a front apron pivotally supported by means which is independent of the bowl and which is in turn supported by the frame; linkage operatively connecting the apron to the bowl, whereby the apron is opened when the bowl is tilted to its digging position; means carried by the frame for tilting the bowl; an end gate pivoted on the bowl; means to open the gate when the bowl is tilted from its carrying position to its dumping position; and means to prevent the apron from becoming wedged open during digging.

15. In a scraper, the combination of: a frame; ground supports for said frame; a bowl pivoted on the frame for tilting movement in a vertical plane, said bowl having a digging edge at its front end; a front apron, pivotally supported by means which is independent of the bowl and which is in turn supported by the frame, in such manner that the apron accompanies the bowl when the latter is tilted to its dumping position; means to restrain the apron from accompanying the bowl when the latter is tilted to its digging position; and means carried by the frame for tilting the bowl.

16. In a scraper, the combination of: a frame; ground supports for said frame; a bowl pivoted on the frame for tilting movement in a vertical plane, said bowl having a digging edge at its front end; a front apron, pivotally supported by means which is independent of the bowl and which is in turn supported by the frame; means to restrain the apron from accompanying the bowl when the latter is tilted to its digging position, said means including an eccentric stop; and means carried by the frame for tilting the bowl.

17. In a scraper, the combination of: a frame; ground supports for said frame; a bowl pivoted at its rear end adjacent its bottom on the frame, for tilting movement in a vertical plane, said bowl having a digging edge at its front end; links pivoted adjacent the rear of the assembly; a front apron pivotally supported by the links; means on the frame, supporting the links, whereby to support the apron when the bowl is in its carrying position and to restrain the apron from accompanying the bowl when the latter is tilted to its digging position; means connecting the apron to the bowl in such a manner that the downward tilting of the bowl from its carrying to its digging position forces the apron to tilt upwardly; means carried by the frame for tilting the bowl; a catch carried by the frame, for engaging at least one of the links when the bowl is in digging position; and means to automatically lock the catch in this position, and to automatically release it for dumping.

18. In a scraper, the combination of: a frame; ground supports for said frame; a bowl pivoted on the frame for tilting movement in a vertical plane, said bowl having a digging edge at its front end; a front apron, pivotally supported by means which is independent of the bowl and which is in turn supported by the frame; means to restrain the apron from accompanying the bowl when the latter is tilted to its digging position, and to positively close the apron as the bowl returns to its carrying position; and means carried by the frame for tilting the bowl.

19. In a scraper, the combination of a frame; ground supports for said frame; a bowl pivoted at its rear end adjacent its bottom on the frame for tilting movement in a vertical plane, said bowl having a digging edge at its front end; links pivoted adjacent the rear of the assembly; a front apron supported by the links; connections between the bowl and the apron; stops on the frame, supporting the links, whereby to support the apron when the bowl is in its carrying position, and in coaction with the above-mentioned connections to restrain the apron from accompanying the bowl when the latter is tilted to its digging position; and means carried by the frame for tilting the bowl.

20. In a scraper, the combination of: a frame; ground supports for the frame; a bowl pivoted on the frame for tilting movement in a vertical plane, said bowl having a digging edge at its front end; a front apron pivotally supported by means which is independent of the bowl and which is in turn supported by the frame; linkage operatively connecting the apron to the bowl, whereby the apron is opened when the bowl is tilted to its digging position; means carried by the frame for tilting the bowl; and means to prevent the apron from becoming wedged open during digging.

THOMAS R. PAULSEN.